(12) United States Patent
Hossan et al.

(10) Patent No.: US 7,241,403 B2
(45) Date of Patent: Jul. 10, 2007

(54) METHOD FOR MAKING A CONDUCTIVE THERMOPLASTIC COMPOSITION

(75) Inventors: Robert Hossan, Delmar, NY (US); Sai-Pei Ting, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 220 days.

(21) Appl. No.: 10/250,023

(22) Filed: May 29, 2003

(65) Prior Publication Data

US 2004/0238793 A1  Dec. 2, 2004

(51) Int. Cl.
- C08J 3/22 (2006.01)
- C08K 3/04 (2006.01)
- C08L 71/00 (2006.01)
- C08G 69/26 (2006.01)
- H01B 1/24 (2006.01)

(52) U.S. Cl. ............... 252/511; 252/500; 252/502; 264/105; 264/478; 524/495; 524/496; 525/92 B; 525/133

(58) Field of Classification Search ......... 252/511, 252/502; 264/105; 524/495, 847; 525/92, 525/133
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Bolton et al. | |
| 3,195,868 A | 7/1965 | Loomans et al. | |
| 3,257,357 A | 6/1966 | Stamanoff | |
| 3,257,358 A | 6/1966 | Stamanoff | |
| 3,306,874 A | 2/1967 | Hay | |
| 3,306,875 A | 2/1967 | Hay | |
| 3,428,699 A | 2/1969 | Schleimer | |
| 3,756,999 A | 9/1973 | Stetter et al. | |
| 3,822,227 A | 7/1974 | Hermann et al. | |
| 3,876,721 A | 4/1975 | Yasui et al. | |
| 3,884,882 A | 5/1975 | Caywood, Jr. | |
| 3,914,266 A | 10/1975 | Hay | |
| 4,011,200 A | 3/1977 | Yonemitsu et al. | |
| 4,028,341 A | 6/1977 | Hay | |
| 4,038,343 A | 7/1977 | Yonemitsu et al. | |
| 4,054,612 A | 10/1977 | Yagi et al. | |
| 4,147,740 A | 4/1979 | Swiger et al. | |
| 4,174,358 A | 11/1979 | Epstein | |
| 4,251,644 A | 2/1981 | Joffrion | |
| 4,315,086 A | 2/1982 | Uenon et al. | |
| 4,346,194 A | 8/1982 | Roura | |
| 4,369,267 A * | 1/1983 | Keung et al. ............. | 523/351 |
| 4,474,927 A | 10/1984 | Novak | |
| 4,600,741 A | 7/1986 | Aycock et al. | |
| 4,642,358 A | 2/1987 | Aycock et al. | |
| 4,742,115 A | 5/1988 | Mawatari et al. | |
| 4,752,135 A | 6/1988 | Loomans | |
| 4,806,297 A | 2/1989 | Brown et al. | |
| 4,806,602 A | 2/1989 | White et al. | |
| 4,826,933 A | 5/1989 | Grant et al. | |
| 4,927,894 A | 5/1990 | Brown | |
| 4,935,472 A | 6/1990 | Brown et al. | |
| 4,974,307 A | 12/1990 | Uebayashi et al. | |
| 4,980,424 A | 12/1990 | Sivavec | |
| 5,041,504 A | 8/1991 | Brown et al. | |
| 5,115,042 A | 5/1992 | Khouri et al. | |
| 5,132,365 A * | 7/1992 | Gallucci ............... | 525/92 B |
| 5,373,046 A * | 12/1994 | Okamura et al. ......... | 524/413 |
| 5,484,837 A * | 1/1996 | Kung et al. ............. | 524/495 |
| 5,484,838 A | 1/1996 | Helms et al. | |

(Continued)

FOREIGN PATENT DOCUMENTS

EP 0153074 A2 2/1985

(Continued)

OTHER PUBLICATIONS

Plascoat LDPE Technical Data Sheet, 3-pages.*

(Continued)

Primary Examiner—Mark Kopec
Assistant Examiner—Kallambella Vijayakumar
(74) Attorney, Agent, or Firm—Cantor Colburn LLP

(57) ABSTRACT

PROBLEM TO BE SOLVED: To provide a production method for a thermoplastic resin composition, composed of a polyphenylene ether and a polyamide, having an electric conductivity, and excellent in balance of fluidity and impact strength, by producing with a specific process, and to provide the thermoplastic resin composition obtained thereby.

SOLUTION: The thermoplastic resin composition is composed of the following component (A)-(E), wherein a weight ratio of (A)/(B) is 5/95-70/30, an amount of (C) is effective to phase-solvate (A) and (B), the amount of (D) is 0.8-10 pts.wt. per the total 100 pts.wt. of (A) and (B), and the amount of component (E) is 5-40 pts.wt. per the total 100 pts.wt. of (A) and (B). The production method for the thermoplastic resin composition is provided. (A): a polyphenylene ether, (B): a polyamide, (C): a phase-solvating agent, (D): an electrically conductive carbon black and/or a fine fibrous carbon, and (E) an improving agent for shock resistance.

19 Claims, No Drawings

U.S. PATENT DOCUMENTS

| | | | |
|---|---|---|---|
| 5,591,382 A | | 1/1997 | Nahass et al. |
| 5,593,227 A | | 1/1997 | Scheuring et al. |
| 5,643,502 A | * | 7/1997 | Nahass et al. ............... 252/511 |
| 5,843,340 A | * | 12/1998 | Silvi et al. ................... 252/511 |
| 5,876,647 A | * | 3/1999 | Makise et al. ............... 264/105 |
| 5,932,159 A | | 8/1999 | Rauwendaal |
| 5,977,240 A | | 11/1999 | Marie Lohmeijer et al. |
| 6,116,770 A | | 9/2000 | Kiani et al. |
| 6,171,523 B1 | | 1/2001 | Silvi et al. |
| 6,221,283 B1 | | 4/2001 | Dharmarajan et al. |
| 6,352,654 B1 | | 3/2002 | Silvi et al. |
| 6,627,701 B2 | | 9/2003 | Adedeji et al. |
| 6,942,823 B2 | * | 9/2005 | Terada et al. ................ 252/511 |

FOREIGN PATENT DOCUMENTS

| | | |
|---|---|---|
| EP | 0627466 A2 | 5/1994 |
| EP | 0 866 098 A1 | 3/1998 |
| WO | WO 01/36536 A1 | 5/2001 |

OTHER PUBLICATIONS

Extract from Merriam Webster Dictionary, 2006, p. 1.*

JP 02201811. Publication Date Oct. 8, 1991 "Conductive Resin Mixture" (Abstract Only).

International Search Report Mailed Oct. 22, 2004.

JP2002194093. Publication Date: Jul. 10, 2002. Abstract Only.

Gallucci et al., "Preparation and Reactions of Epoxy-Modified Polyethylene", J. Appl. Poly. Sci., vol. 27, pp. 425-437 (1982).

* cited by examiner

METHOD FOR MAKING A CONDUCTIVE THERMOPLASTIC COMPOSITION

BACKGROUND OF INVENTION

This disclosure relates to a method of making conductive thermoplastic compositions, particularly conductive poly(arylene ether)/polyamide compositions.

Conductive carbon black has been successfully used in combination with a variety of thermoplastic resins to form conductive thermoplastic compositions. However, the formation of these conductive thermoplastic compositions can be challenging due to the low bulk density of conductive carbon black. One approach has been to form a concentrate or masterbatch containing a thermoplastic resin and conductive carbon black and then adding the concentrate to the thermoplastic composition. While this approach is an improvement in making conductive thermoplastic compositions, difficulties still remain in the formation of the conductive masterbatch due to the low bulk density of conductive carbon black. Accordingly, further improvements in the methods of making conductive masterbatches and conductive thermoplastic compositions are needed.

SUMMARY OF INVENTION

Disclosed herein is a method of making a conductive masterbatch comprising mixing conductive carbon black and a first resin to form a conductive carbon black/resin mixture; compounding the conductive carbon black/resin mixture with a second resin, wherein the first resin is a powder having a particle size of about 20 micrometers to about 4 millimeters.

In another embodiment a method of making a conductive thermoplastic composition comprises mixing conductive carbon black and a first resin to form a conductive carbon black/resin mixture; compounding the conductive carbon black/resin mixture with a second resin to form a conductive masterbatch and compounding the conductive masterbatch with a third resin and an optional fourth resin, wherein the first resin is a powder having a particle size of about 20 micrometers to about 4 millimeters.

The above and other features are exemplified by the following detailed description.

DETAILED DESCRIPTION

Disclosed herein is a method of making a conductive masterbatch. The method comprises mixing conductive carbon black and a first resin to form a conductive carbon black/resin mixture and compounding the conductive carbon black/resin mixture with a second resin to form the masterbatch. The first resin is in powder form and acts as a flow promoter, facilitating the addition of the low bulk density conductive carbon black to the compounding device. The powdered first resin also facilitates subsequent compounding. The first and the second resins may both be in powder form or the second resin may be in pellet form. Similarly the first and second resin may be chemically identical or different. In one embodiment the first and second resins are polyamide resins. A thermoplastic composition may be made by adding the conductive masterbatch to one or more thermoplastic resins or resin blends. Thermoplastic compositions made with the conductive masterbatch exhibit improved conductivity when compared to similar compositions made without the conductive masterbatch.

Suitable conductive carbon blacks are those capable of modifying the conductive properties of a thermoplastic resin or composition. Such carbon blacks are commercially available and are sold under a variety of trade names, including, but not limited to, S.C.F. (Super Conductive Furnace), E.C.F. (Electric Conductive Furnace), Ketjen Black EC (available from Akzo Co., Ltd.) or acetylene black. Preferred carbon blacks are those having average particle sizes less than or equal to about 200 nanometer (nm), more preferably less than or equal to about 100 nm, and most preferably less than or equal to about 50 nm. Preferably conductive carbon blacks may also have surface area greater than or equal to about 200 square meter per gram ($m^2/g$), more preferably greater than or equal to about 400 $m^2/g$, and most preferably greater than or equal to about 1000 $m^2/g$. Preferred conductive carbon blacks may have a pore volume (dibutyl phthalate absorption) greater than or equal to about 40 cubic centimeters per hundred grams ($cm^3/100$ g), more preferably greater than or equal to about 100 $cm^3/100$ g, and most preferably greater than or equal to about 150 $cm^3/100$ g.

The conductive masterbatch comprises about 4 weight percent (wt %) to about 16 wt percent (wt %) conductive carbon black based on the total weight of the conductive masterbatch. Within this range, the masterbatch preferably comprises greater than or equal to about 5 wt % conductive carbon black, with greater than or equal to about 6 wt % conductive carbon black more preferred, and greater than or equal to about 8 wt % conductive carbon black especially preferred. Also with in this range, the masterbatch preferably comprises less than or equal to about 16 wt % conductive carbon black, with less than or equal to about 14 wt % conductive carbon black more preferred, and less than or equal to about 12 wt % conductive carbon black especially preferred.

Suitable resins for use in the conductive masterbatch include polycarbonate; poly(arylene ether); poly(alkenyl aromatic); polyolefins; diene derived polymers such as polybutadiene and polyisoprene; polyacrylamide; polyamides; polyesters; polyestercarbonates; polyethersulfones; polyetherketones; polyetherimides; copolymers thereof; copolymers of alkenyl aromatic compounds and acrylonitrile; blends of two or more of the foregoing; and the like.

As mentioned above the conductive carbon black is combined with a resin in powder form. The resin powder has a particle size of about 20 micrometers to about 4 millimeters. Within this range the particle size is preferably greater than or equal to about 50, more preferably greater than or equal to about 100 and most preferably greater than or equal to about 150 micrometers. Also within this range the particle size is preferably less than or equal to about 2, more preferably less than or equal to about 1.5 and most preferably less than or equal to about 1 millimeters. Particle size, as defined herein, refers to the maximum size of the particle, although some particles may be smaller, as when a material is sifted through a sieve with a particular mesh size.

Preferably one or more of the resins employed in the masterbatch comprise polyamide. Polyamide resins include a generic family of resins known as nylons, characterized by the presence of an amide group (—C(O)NH—). Nylon-6 and nylon-6,6 are the generally preferred polyamides and are available from a variety of commercial sources. Other polyamides, however, such as nylon-4,6, nylon-12, nylon-6,10, nylon 6,9, nylon 6/6T and nylon 6,6/6T with triamine contents below about 0.5 weight percent, as well as others, such as the amorphous nylons may be useful in the conductive masterbatch and the thermoplastic composition. Mixtures of various polyamides, as well as various polyamide copolymers, are also useful. An especially preferred polyamide is polyamide-6,6.

Polyamides can be obtained by a number of well known processes such as those described in U.S. Pat. Nos. 2,071,250; 2,071,251; 2,130,523; 2,130,948; 2,241,322; 2,312,966; and 2,512,606. Nylon-6, for example, is a polymerization product of caprolactam. Nylon-6,6 is a condensation product of adipic acid and 1,6-diaminohexane. Likewise, nylon 4,6 is a condensation product between adipic acid and 1,4-diaminobutane. Besides adipic acid, other useful diacids for the preparation of nylons include azelaic acid, sebacic acid, dodecane diacid, as well as terephthalic and isophthalic acids, and the like. Other useful diamines include m-xylyene diamine, di-(4-aminophenyl)methane, di-(4-aminocyclohexyl)methane, 2,2-di-(4-aminophenyl)propane, 2,2-di-(4-aminocyclohexyl)propane, among others. Copolymers of caprolactam with diacids and diamines are also useful.

The conductive masterbatch may contain about 84 wt % to about 96 wt % of resin based on the total weight of the conductive masterbatch. Within this range, the masterbatch preferably comprises less than or equal to about 95 wt % resin, more preferably less than or equal to about 94 wt % resin, and most preferably less than or equal to about 92 wt % resin. Also within this range, the masterbatch preferably comprises greater than or equal to about 83 wt % resin, more preferably greater than or equal to about 86 wt % resin, and most preferably greater than or equal to about 88 wt % resin.

The conductive masterbatch is made by mixing the conductive carbon black with powdered resin to form a conductive carbon black/resin mixture and then compounding the conductive carbon black/resin mixture with additional resin. The additional resin may be in powdered or pellet form. Additionally, the additional resin may chemically identical to or different from the powdered resin. The conductive carbon black/resin mixture and the additional resin may be added to a melt mixing device simultaneously or sequentially. Preferably they are added sequentially, even more preferably the conductive carbon black/resin mixture is added to the melt mixing device after the additional resin.

In an exemplary embodiment, polyamide is added to the feedthroat of an extruder, the conductive carbon black is dry blended with powdered polyamide to form the conductive carbon black/polyamide mixture, which is added via a feedport downstream of the feedthroat. The weight ratio of the powdered polyamide to the polyamide in pellet form is about 1:9 to about 9:1 and preferably is about 2:8 to about 6:4 based on a 10 weight percent loading of conductive carbon black in the masterbatch. After compounding, the conductive masterbatch can be pelletized and added to one or more thermoplastic resins or resin blends at a later time or immediately added as a melt to one or more thermoplastic resins or resin blends to form a conductive thermoplastic composition.

The conductive thermoplastic composition may comprise any resin or combination of resins that is compatible with the conductive masterbatch. Determining compatible resins is well within the abilities of one of ordinary skill in the art.

When the conductive masterbatch comprises polyamide the conductive thermoplastic composition preferably comprises poly (arylene ether). The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether) per se, are known polymers comprising a plurality of structural units of the formula (I):

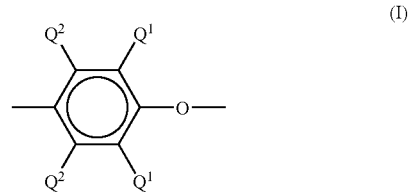

wherein for each structural unit, each $Q^1$ is independently hydrogen, halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. Preferably, each $Q^1$ is alkyl or phenyl, especially C alkyl, and each $Q^2$ is hydrogen.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer.

The poly(arylene ether) generally has a number average molecular weight of about 3,000 to about 40,000 atomic mass units (amu) and a weight average molecular weight of about 20,000 to about 80,000 amu, as determined by gel permeation chromatography. The poly (arylene ether) may have an intrinsic viscosity of about 0.10 to about 0.60 deciliters per gram (dl/g), preferably about 0.29 to about 0.48 dl/g, as measured in chloroform at 25 Â° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

The poly(arylene ether) are generally prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether) for many purposes are those, which comprise molecules having one aminoalkyl-containing end group. The aminoalkyl radical is generally located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, generally obtained from reaction mixtures in which a by-product diphenoquinone is present, especially in a copper-halide-secondary or tertiary amine system. A substantial proportion of the polymer molecules, typically constituting as much as about 90% by weight of the polymer, may contain said aminoalkyl-containing and 4-hydroxybiphenyl end groups.

Based upon the foregoing, it will be apparent to those skilled in the art that the contemplated poly(arylene ether) resin may include many of those poly(arylene ether) resins presently known, irrespective of variations in structural units or ancillary chemical features.

The conductive thermoplastic composition comprises about 10 wt % to about 70 wt % poly(arylene ether) resin based on the total weight of the conductive thermoplastic composition. Within this range the composition preferably comprises greater than or equal to about 10 wt % poly (arylene ether), more preferably greater than or equal to about 20 wt % poly(arylene ether), and most preferably greater than or equal to about 30 wt % poly(arylene ether). Also within this range the composition preferably comprises less than or equal to about 70 wt % poly(arylene ether), with less than or equal to about 60 wt % poly(arylene ether) more preferred, and less than or equal to about 50 wt % poly (arylene ether) especially preferred.

In one embodiment, the conductive thermoplastic composition is a blend of poly(arylene ether) resin and a polyamide resin as described above. The polyamide resin may be the same or different from the polyamide(s) employed in the conductive masterbatch. The conductive thermoplastic composition comprises about 30 wt % to about 90 wt % polyamide resin based on the total weight of the conductive thermoplastic composition. Within this range the composition preferably comprises greater than or equal to about 30 wt % polyamide, more preferably greater than or equal to about 35 wt % polyamide, and most preferably greater than or equal to about 40 wt % polyamide. Also within this range the composition preferably comprises less than or equal to about 90 wt % polyamide, with less than or equal to about 80 wt % polyamide more preferred, and less than or equal to about 70 wt % polyamide especially preferred.

When the conductive thermoplastic composition comprises poly (arylene ether) and polyamide the composition may also comprise a compatibilizer. A compatibilizer is a polyfunctional compound that interacts with either the poly (arylene ether), the polyamide resin, or both. This interaction may be chemical (e.g. grafting) and/or physical (e.g. affecting the surface characteristics of the dispersed phases). In either instance the resulting poly(arylene ether)/polyamide composition appears to exhibit improved compatibility, e.g., as may be evidenced by enhanced impact strength, mold knit line strength and/or elongation. The composition comprises about 0 wt % to about 25 wt % compatibilizer, based on the total weight of the composition. The two-fold purpose for using compatibilizer is to improve, in general, the physical properties of the poly (arylene ether)/polyamide resin blend, as well as to enable the use of a greater proportion of the polyamide.

Examples of the various compatibilizers that may be employed include: a) liquid diene polymers, b) epoxy compounds, c) oxidized polyolefin wax, d) quinones, e) organosilane compounds, f) polyfunctional compounds and functionalized poly(arylene ether) as described obtained by reacting one or more of the previously mentioned compatibilizing agents with poly(arylene ether) hereinafter. The foregoing compatibilizers are more fully described in U.S. Pat. Nos. 4,315,086; 4,600,741; 4,642,358; 4,826,933; 4,927,894; 4,980,424; 5,041,504; and 5,115,042.

The foregoing compatibilizers may be used alone or in various combinations comprising one of these compatibilizers. Furthermore, they may be added directly to the melt blend or pre-reacted with either or both of the poly(arylene ether) and polyamide, as well as with other materials employed in the preparation of the composition. Where the compatibilizer is employed in the preparation of the compositions, the initial amount used will be dependent upon the specific compatibilizer chosen and the specific amounts of poly(arylene ether) resin and polyamide employed.

The conductive thermoplastic composition may further comprise an impact modifier or combination of impact modifiers. Particularly suitable thermoplastic impact modifiers are block copolymers, for example, A-B diblock copolymers and A-B-A triblock copolymers having of one or two alkenyl aromatic blocks A, which are typically styrene blocks, and a rubber block, B, which is typically an isoprene or butadiene block. The butadiene block may be partially hydrogenated. Mixtures of these diblock and triblock copolymers are especially useful.

Suitable A-B and A-B-A copolymers include but are not limited to polystyrene-polybutadiene, polystyrene-poly(ethylene-propylene), polystyrene-polyisoprene, poly(I±-methylstyrene)-polybutadiene, polystyrene-polybutadiene-polystyrene (SBS), polystyrene-poly (ethylene-propylene)-polystyrene, polystyrene-polyisoprene-polystyrene and poly (alpha-methylstyrene)-polybutadiene-poly (alpha-methylstyrene), as well as the selectively hydrogenated versions thereof, and the like. Mixtures of the aforementioned block copolymers are also useful. Such A-B and A-B-A block copolymers are available commercially from a number of sources, including Phillips Petroleum under the trademark SOLPRENE, Shell Chemical Co., under the trademark KRATON, Dexco under the trademark VECTOR, and Kuraray under the trademark SEPTON.

A useful amount of impact modifier is up to about 20 weight percent (wt %), with about 5 wt % to about 15 wt % preferred, and about 8 wt % to about 12 wt % especially preferred, wherein the weight percentages are based on the entire weight of the composition. In an especially preferred embodiment, the impact modifier comprises a polystyrene-polybutadiene-polystyrene block copolymer.

The conductive thermoplastic composition may further comprise one or more additives. Possible additives include anti-oxidants, drip retardants, dyes, pigments, colorants, stabilizers, small particle mineral (e.g., clay, mica, talc, and the like), antistatic agents, plasticizers, lubricants, and combinations comprising at least one of the foregoing additives. These additives are known in the art, as are their effective levels and methods of incorporation. Effective amounts of the additives vary widely, but they are usually present in an amount of less than or equal to about 50 wt %, based on the total weight of the composition. Especially preferred additives include hindered phenols, thio compounds and amides derived from various fatty acids. The preferred amount of these additives is generally about 0.25 wt % to about 2 wt %, based upon the total weight of the composition.

The preparation of the conductive thermoplastic compositions is achieved by merely blending the ingredients under conditions for the formation of intimate blend. This can be achieved by various techniques that employ kneader, mixer, single screw extruder, twin screw extruder and the like.

All of the ingredients may be added initially to the processing system, or some components may be precompounded. In one embodiment the poly(arylene ether) resin, optional impact modifier. (s) and compatibilizer are added to the feedthroat of an extruder and the polyamide resin and conductive masterbatch are fed concurrently through a feedport downstream. In an alternative embodiment the poly (arylene ether) resin, compatibilizers, conductive masterbatch, optional impact modifier and some or all of the polyamide are added in the feedthroat, and the remaining portion of the polyamide, when present, is added downstream. While separate extruders may be used in the processing, these compositions are preferably prepared by using a single extruder having multiple feedports along its length to accommodate the addition of the various components. It is often advantageous to apply a vacuum to the melt through at least one or more vent ports in the extruder to remove volatile impurities in the composition. Those of ordinary skill in the art will be able to adjust blending times and temperatures, as well as component addition, without undue additional experimentation.

It should be clear that compositions and articles made from the compositions made by the method of this disclosure are within the scope of the disclosure.

The disclosure is further illustrated by the following non-limiting examples.

EXAMPLES 1-12

Conductive masterbatches containing 10 wt % conductive carbon black (Ketjenblack® EC600JD, available from Akzo Nobel) and 90 wt % polyamide (polyamide 6,6 available from DuPont) were made using a Wemer-Pfleiderer 30 millimeter twin-screw extruder with ten barrels. The screw speed was 350 rotations per minute (rpm). The temperature was about 250° C. to 290° C. The stranding die was equipped with a two hole die plate. The strands were cooled in a water bath and cut with a standard strand pelletizer.

In example 1 all of the polyamide 6,6 was in pellet form and the temperature was about 290° C. In examples 2-6 ground polyamide having a particle size less than or equal to about 600 micrometers was mixed with the conductive carbon black and the conductive carbon black/polyamide mixture was added to the extruder downstream. The temperature was 250° C. In example 7 all polyamide was added in pellet form at the extruder feedthroat and the temperature was 250° C. In examples 8-12 ground polyamide was mixed with the conductive carbon black and the conductive carbon black/polyamide mixture was added with the polyamide pellets at the extruder feedthroat. The temperature was 250° C. Relative amounts of the components in weight percent, the mode of feed, the run rate in pounds per hour, temperature profile in ° C. and observations on extrusion are shown in Table 1.

TABLE 1

| Ex. | Pellet polyamide | Conductive carbon black | Ground polyamide | Run Rate | Temp Profile | Comment on Extrusion |
|---|---|---|---|---|---|---|
| 1* | 90 | 10 | — | 30 | 290 | feeder limitation, struggling run |
| 2 | 72 | 10 | 18 | 30 | 250 | ran well |
| 3 | 54 | 10 | 36 | 30 | 250 | ran well |
| 4 | 36 | 10 | 54 | 20 | 250 | ran well |
| 5 | 18 | 10 | 72 | 18 | 250 | ran at very slow rate, plugged die later on |
| 6 | — | 10 | 90 | — | 250 | plugged die instantly |
| 7* | 90 | 10 | — | — | 250 | too fluffy to feed |
| 8 | 72 | 10 | 18 | — | 250 | too fluffy to feed |
| 9 | 54 | 10 | 36 | 18 | 250 | ran moderately well |
| 10 | 36 | 10 | 54 | — | 250 | too fluffy to feed |
| 11 | 18 | 10 | 72 | — | 250 | too fluffy to feed |
| 12 | — | 10 | 90 | — | 250 | too fluffy to feed |

*Comparative examples

Examples 1-12 demonstrate that combining conductive carbon black powder and ground polyamide to form a conductive carbon black/polyamide mixture improves the formation of the conductive carbon black masterbatch, particularly when the carbon black/polyamide mixture is added to the extruder downstream.

EXAMPLES 13-24

Conductive thermoplastic compositions using the masterbatches prepared in examples 1-12 (herein referred as masterbatches 1-12) were prepared using an extruder. A dry blend mixture containing 34.1 wt % of polyphenylene ether having an intrinsic viscosity of 0.40 dl/g measured in chloroform at 25 Â° C., 8 wt % of an impact modifier (KG 1701 available from Shell), 7 wt % of a second impact modifier (KG 1651 available from Shell), 0.7 wt % citric acid, 0.3 wt % of a stabilizer (Irganox 1076 available from Ciba), 0.1 wt % potassium iodide and 0.01 wt % copper iodide was added at the feedthroat of the extruder. A mixture of 20 weight percent polyamide 6,6, 10 weight percent polyamide 6 and 20 weight percent of a masterbatch as shown in Table 2 was added at a second feeder located down stream of the feedthroat.

The thermoplastic compositions were tested for Izod impact strength according to ISO 180, Dynatup impact strength at 23 Â° C. according to ASTM 256, and melt viscosity (MV) at 282 Â° C. and 1500 seconds$^{-1}$ according to DIN54811. The test results are shown in Table 2. Izod impact values are in kilojoules per square meter. Dynatup impact strength values are in Joules. Surface volume resistivity values are in kilo-ohm-centimeters and melt viscosity values are in Pascal-seconds. Surface volume resistivity (SVR) was tested by the following method. Tensile bars (ISO 527) were scored at both ends with a knife and cooled in freezer (2 hr at −40 Â° C.). The bars were cold fractured at the score marks to obtain brittle fractures. Both ends were painted with conductive silverpaint (Du Pont Electric 4817N) and the resistance was measured with a multimeter. The read-out resistance was corrected for the dimensions of the piece (length, width and thickness). SVR=Resistivity measured*Fracture area (square centimeters)/length (centimeters). Values reported in the Table 2 are an average of five specimens tested.

TABLE 2

| Example | Masterbatch | Izod Impact | Dynatup Impact | SVR | MV |
|---|---|---|---|---|---|
| 13* | 1 | 16.1 | 22.8 | Non-conductive | 264 |
| 14 | 2 | 54.2 | 41.9 | 70 | 294 |
| 15 | 3 | 56.6 | 42.0 | 9,639 | 281 |
| 16 | 4 | 56.1 | 41.1 | 11,062 | 293 |
| 17 | 5 | 56.3 | 40.0 | 12,510 | 285 |
| 18 | 9 | 59.5 | 38.2 | 11,544 | 276 |

A comparison of the physical properties of Examples 13-18 indicates that the method of preparation of masterbatch has a significant impact upon the properties of the conductive thermoplastic composition. Notably, comparative Example 13 in which the masterbatch was prepared using only polyamide in pellet form exhibits markedly lower impact properties and conductivity than Examples 14-18 in which the masterbatches were prepared using a combination of powdered and pellet polyamide.

While the disclosure has been described with reference to a preferred embodiment, it will be understood by those skilled in the art that various changes may be made and equivalents may be substituted for elements thereof without departing from the scope of the discovery. In addition, many modifications may be made to adapt a particular situation or material to the teachings of the discovery without departing from essential scope thereof. Therefore, it is intended that the disclosure not be limited to the particular embodiment disclosed as the best mode contemplated for carrying out this discovery, but that the discovery will include all embodiments falling within the scope of the appended claims.

All cited patents, patent applications, and other references are incorporated herein by reference in their entirety.

The invention claimed is:

1. A method of making conductive carbon black masterbatch comprising dry mixing conductive carbon black and a first resin to form a carbon black/resin mixture; and compounding the carbon black/resin mixture with a second resin, wherein the first resin is a powder having a particle size of about 20 micrometers to about 4 millimeters, and further wherein the first resin and second resin are polyamide.

2. The method of claim 1, wherein the conductive carbon black has average particle size less than about 200 nanometers.

3. The method of claim 1, wherein the first resin has a particle size of about 100 micrometers to about 1 millimeter.

4. The method of claim 1, wherein the conductive masterbatch comprises about 4 to about 16 weight percent conductive carbon black based on the total weight of the conductive masterbatch.

5. The method of claim 1, wherein the first resin and second resin are chemically identical.

6. The method of claim 1, wherein the first resin and second resin are chemically different.

7. The method of claim 1, wherein the conductive masterbatch comprises about 84 to about 96 weight percent resin based on the total weight of the masterbatch.

8. The method of claim 1, wherein compounding occurs in an extruder having a feedthroat and a feedport and the second resin is added at the feedthroat and the conductive carbon black/resin mixture is added via a feedport downstream of the feedthroat.

9. The method of claim 1, wherein the first resin is a polyamide and the second resin is a polyamide in pellet form and the weight ratio of the first resin to the second resin is about 1:9 to about 9:1.

10. A method of making a conductive thermoplastic composition comprising:
dry mixing conductive carbon black and a first resin to form a conductive carbon black/resin mixture;
compounding the conductive carbon black/resin mixture with a second resin to form a conductive masterbatch; and
compounding the conductive masterbatch with a third resin and fourth resin, wherein the first resin is a powder having a particle size of about 20 micrometers to about 4 millimeters and wherein the first, second and fourth resin are polyamides and the third resin is a poly(arylene ether).

11. The method of claim 10, wherein the conductive carbon black has average particle size less than about 200 nanometers.

12. The method of claim 10 wherein the first resin has a particle size of 100 micrometers to about 1 millimeter.

13. The method of claim 10, wherein the first resin and second resin are chemically identical.

14. The method of claim 10, wherein the first resin and second resin are chemically different.

15. The method of claim 10, further comprising compounding the third resin with a compatibilizer prior to compounding with the masterbatch and fourth resin.

16. The method of claim 10, further comprising compounding the third resin with a compatibilizer, and impact modifier prior to compounding with the masterbatch and fourth resin.

17. The method of claim 10, wherein an impact modifier and a compatibilizer are compounded with the masterbatch and third and fourth resins.

18. A method of making a conductive thermoplastic composition comprising:
dry mixing conductive carbon black and a first polyamide resin to form a conductive carbon black/resin mixture;
compounding the conductive carbon black/resin mixture with a second polyamide resin to form a conductive masterbatch;
compounding a poly(arylene ether) resin, an impact modifier and a compatibilizer to form a resin mixture; and
and compounding the conductive masterbatch and third polyamide with the resin mixture, wherein the first resin is a powder having a particle size of about 20 micrometers to about 4 millimeters.

19. The method of claim 18, wherein the conductive masterbatch and third polyamide are added to the resin mixture concurrently.

* * * * *

UNITED STATES PATENT AND TRADEMARK OFFICE
CERTIFICATE OF CORRECTION

PATENT NO. : 7,241,403 B2
APPLICATION NO. : 10/250023
DATED : July 10, 2007
INVENTOR(S) : Hossan et al.

It is certified that error appears in the above-identified patent and that said Letters Patent is hereby corrected as shown below:

Title Page:
(57) Abstract, delete in it's entirety and insert therefor -- Disclosed herein is a method of making conductive thermoplastic compositions, particularly conductive poly(arylene ether)/polyamide compositions using a conductive masterbatch, whereas the conductive masterbatch is made by a method comprising mixing conductive carbon black and a first resin to form a conductive carbon black/resin mixture; and compounding the conductive carbon black/resin mixture with a second resin, wherein the first resin is a powder.--

Column 4:
Line 26, after "C" insert therefor -- $_{1-4}$ --
Line 49, after "25" delete -- Â --

Column 6:
Line 29, after "poly" delete "( ]±" and insert therefor -- (α --

Column 8:
Line 43, after "25" delete "Â"
Line 55, after "23" delete "Â"
Line 56, after "282" delete "Â"
Line 64, after "40" delete "Â"

Signed and Sealed this

Eleventh Day of March, 2008

JON W. DUDAS
*Director of the United States Patent and Trademark Office*